United States Patent
Karr et al.

(10) Patent No.: US 8,042,163 B1
(45) Date of Patent: Oct. 18, 2011

(54) SECURE STORAGE ACCESS USING THIRD PARTY CAPABILITY TOKENS

(75) Inventors: Ronald S. Karr, Palo Alto, CA (US);
John R. Finlay, Eastsound, WA (US);
Ramana Jonnala, Sunnyvale, CA (US);
Dhanesh V. Joshi, Santa Clara, CA (US); Narasimha R. Valiveti, San Jose, CA (US)

(73) Assignee: Symatec Operating Corporation, Mountain View, CA (US)

( * ) Notice: Subject to any disclaimer, the term of this patent is extended or adjusted under 35 U.S.C. 154(b) by 2125 days.

(21) Appl. No.: 10/850,466

(22) Filed: May 20, 2004

(51) Int. Cl.
*G06F 15/16* (2006.01)

(52) U.S. Cl. ......... 726/9; 726/2; 726/6; 726/8; 713/185; 713/186; 713/164

(58) Field of Classification Search .................. 729/9
See application file for complete search history.

(56) References Cited

U.S. PATENT DOCUMENTS

| | | | | |
|---|---|---|---|---|
| 5,764,890 | A * | 6/1998 | Glasser et al. | 726/11 |
| 5,784,463 | A * | 7/1998 | Chen et al. | 713/171 |
| 6,088,451 | A * | 7/2000 | He et al. | 726/8 |
| 6,263,446 | B1 | 7/2001 | Kausik et al. | |
| 6,314,425 | B1 * | 11/2001 | Serbinis et al. | 707/10 |
| 6,324,537 | B1 * | 11/2001 | Moran | 707/9 |
| 6,385,729 | B1 * | 5/2002 | DiGiorgio et al. | 726/9 |
| 6,453,362 | B1 | 9/2002 | Bittinger et al. | |
| 6,587,867 | B1 * | 7/2003 | Miller et al. | 709/200 |
| 6,615,264 | B1 * | 9/2003 | Stoltz et al. | 709/227 |
| 6,856,800 | B1 | 2/2005 | Henry et al. | |
| 7,028,090 | B2 * | 4/2006 | McBrearty et al. | 709/229 |
| 7,111,324 | B2 * | 9/2006 | Elteto et al. | 726/9 |
| 7,134,138 | B2 * | 11/2006 | Scherr | 726/2 |
| 7,191,344 | B2 * | 3/2007 | Lin et al. | 713/193 |
| 7,191,467 | B1 * | 3/2007 | Dujari et al. | 726/5 |
| 7,231,526 | B2 * | 6/2007 | Hon et al. | 713/185 |
| 7,275,259 | B2 * | 9/2007 | Jamieson et al. | 726/8 |
| 2003/0084171 | A1 * | 5/2003 | de Jong et al. | 709/229 |
| 2003/0084292 | A1 * | 5/2003 | Pierce et al. | 713/168 |

(Continued)

OTHER PUBLICATIONS

Gibson et al., "File Server Scaling with Network-Attached Secure Disks," Proceeding of the ACM International Conference on Measurement and Modeling of Computer Systems, Jun. 15-18, 1997 (13 Pages).

Gibson et al., "Filesystems for Network-Attached Secure Disks," CMU-CS-97-118, Jul. 1997, (18 Pages).

Gibson et al., "A Cost-Effective, High Bandwidth Storage Architecture," Proceedings of the 8$^{th}$ Conference on Architectual Support for Programming Languages and Operating Systems, 1998, (12 Pages).

(Continued)

*Primary Examiner* — Kambiz Zand
*Assistant Examiner* — Yonas Bayou
(74) *Attorney, Agent, or Firm* — Robert C. Kowert; Meyerstons, Hood, Kivlin, Kowert & Goetzel, P.C.

(57) ABSTRACT

A method for revocable token identifiers may be employed in a shared storage environment. An access server may generate access tokens and include revocable token identifiers previously obtained from storage devices. When clients present access tokens to storage devices during storage requests, storage devices may check the validity of access tokens by verifying that the revocable token identifiers were previously issued to the access server. An access server may request that the storage device revoke revocable token identifiers. Storage devices may deny any future storage requests including revoked token identifiers. Additionally, an access token may include instructions specifying operations for a storage device to perform in conjunction with a storage request. A trusted server may issue grantor tokens granting permissions for access servers to use when issuing access tokens. An access server may then include such a grantor token in access tokens that it generates and issues to clients.

24 Claims, 9 Drawing Sheets

U.S. PATENT DOCUMENTS

| | | | |
|---|---|---|---|
| 2003/0163725 A1* | 8/2003 | Feuser et al. | 713/200 |
| 2003/0172265 A1* | 9/2003 | Vu et al. | 713/164 |
| 2003/0187883 A1* | 10/2003 | Zelenka et al. | 707/201 |
| 2003/0204743 A1* | 10/2003 | Devadas et al. | 713/200 |
| 2004/0103325 A1* | 5/2004 | Priebatsch | 713/202 |
| 2004/0153451 A1* | 8/2004 | Phillips et al. | 707/8 |
| 2004/0255143 A1* | 12/2004 | Wemyss et al. | 713/200 |

OTHER PUBLICATIONS

Czerwinski et al., "An Architecture for a Secure Service Discovery Service," Computer Science Division, University of California, Berkeley, 1999, (pp. 24-35).

Sandhu et al., "Access Control: Principles and Practice," IEEE Computer, Sep. 1994, (pp. 40-48).

* cited by examiner

SECURE STORAGE ACCESS USING THIRD PARTY CAPABILITY TOKENS

BACKGROUND OF THE INVENTION

1. Field of the Invention

This invention relates to access tokens in distributed data storage environments and, more particularly, to secure block level capability tokens using revocable token identifiers.

2. Description of the Related Art

Modern distributed storage environments may include many storage objects connected via an interconnection network. An interconnection network provides the infrastructure to connect the various elements of a distributed shared storage environment. Within the storage environment, file system abstractions may be built on top of virtual storage (for example, logical volumes) that may be distributed across multiple storage devices. As the number of volume and file system abstractions grows, the complexity of the entire storage environment grows dramatically.

In order to limit bottlenecking and the resulting restricted data throughput, distributed shared storage environments may separate the actual storage of data from the management of that data. Storage architectures that employ this technique may be referred to as out-of-band systems. An access server, sometimes called a metadata server (MDS), may supply the required data management and control functions including, among others, file system mapping or virtualization, client authentication, and the granting access privileges. The data itself may be stored on various storage devices attached to the network, but not necessarily connected directly to the access server. Such storage devices may provide data storage functions without having to worry about the metadata or file system virtualization or management.

Client applications, or hosts, may initially contact the access server to request access to a specific file, dataset, or range of data blocks. The access server may, after authenticating the client and applying whatever data access policies are relevant, provide the requesting client node with information about what storage device contains that particular dataset. Client nodes may then communicate directly with the storage device when reading or writing data.

SUMMARY

In shared storage environments, access servers and storage devices may implement revocable token identifiers for use when granting access tokens. In certain embodiments, an access server may generate an access token, or capability token, that not only may specify the exact permissions and privileges that a client may perform or request on a storage device, but may also include a revocable token identifier previously obtained from the storage device. Thus, when the client presents the access token to the storage device during a storage or I/O request, the storage device may check the validity of access token by verifying that the revocable token identifier was one previously issued to the access server and may also verify that it has not been revoked.

Revocable token identifiers may be negotiated between a storage device and an access server in various ways according to different embodiments. In one embodiment, an access server may request a set of revocable token identifiers from a storage device prior to issuing any access tokens granting access permissions on that storage device and the storage device may issue the revocable token identifiers to the access server. Alternately, in another embodiment, an access server may generate revocable token identifiers and may and inform a storage device of the specific revocable identifiers it intends to use.

An access server may, according to one embodiment, revoke one or more issued access tokens by requesting that the storage device revoke the appropriate revocable token identifiers that were included in the access tokens. After an access server has requested that a storage device revoke a particular token identifier, the storage device may deny any future storage request including an access token with that token identifier.

Additionally, according to some embodiments, an access token may include additional instructions specifying operations for a storage device to perform in conjunction with a storage request including such an access token. The storage device may then perform certain activities, such as mirroring, special logging, encryption, etc. per the instructions regarding a client's storage request. The access server may include such instructions without the client's knowledge, in one embodiment, or, in a different embodiment, a client may request these operations when obtaining an access token.

An access server may obtain its right to issue access tokens from another, more trusted, server, according to certain embodiments. In such an embodiment, a trusted server may be configured to grant permissions for other servers to issue access tokens granting access permissions on one or more storage devices. For example, a trusted server may be a volume server that may, in one embodiment, allow other servers to grant access permissions for a specific volume, or for specific portions of a volume, on storage devices. In such an embodiment, an access server may then include a grantor token, or a reference to a grantor token, in access tokens that it generates and issues to clients. Thus, an access token may be a compound, or layered token, in some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
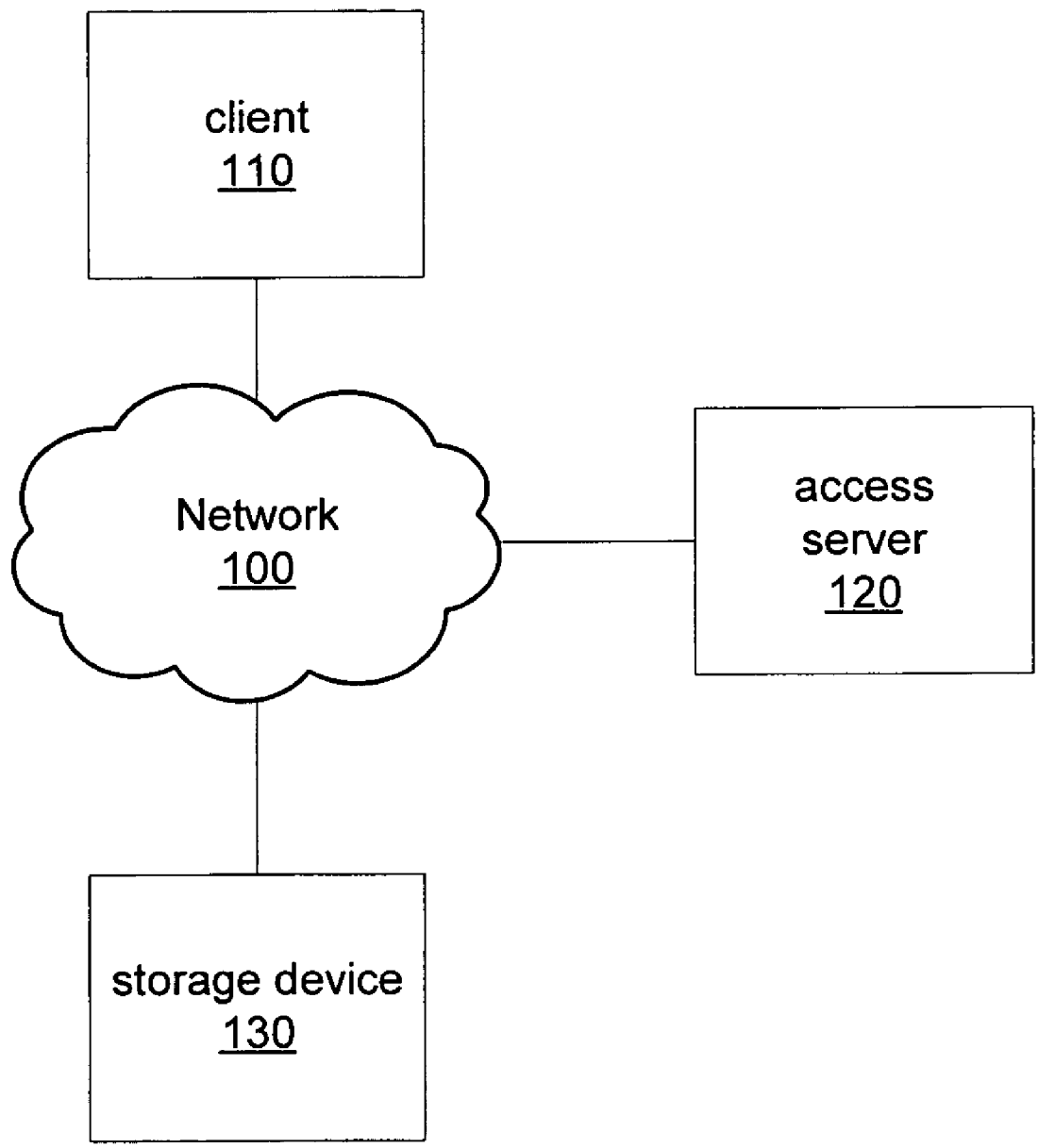
FIG. 1 is a block diagram illustrating, according to one embodiment, networked computer devices that may be configured to implement secure, block-level capability tokens including revocable token identifiers as described herein.

FIG. 1 illustrates a computer network, according to certain embodiments, in which one or more devices may be configured to implement secure, block-level capability tokens including revocable token identifiers. In such an embodiment, at least one computing device on network 100 may be a client device, such as client 110 with installed software that may be configured to communicate with other devices, request access to, and exchange data with, storage devices. In one embodiment, at least one computing device on network 100 may be a server device, such as access server 120 with installed software that may be configured to communicate with other devices, issue access tokens granting data I/O permissions on storage devices, receive revocable token identifiers from storage devices, and include revocable token identifiers in issued access tokens. In one embodiment, access server 120 may also be configured as a client device similar to client 110, while in another embodiment access server may be configured as a metadata server in a distributed storage environment. According to some embodiments, one or more devices may be storage devices, such as storage device 130. Storage device 130 may be configured to provide data storage and retrieval services to other devices, such as client 110 and access server 120. In certain embodiments, storage devices, such as storage device 130, may be configured to provide revocable token identifiers to other devices, such as assess server 120, and may also be configured to recognize and validate access tokens provided by clients.

In certain embodiments, access server 120 and storage device 130 may represent at least part of a distributed storage system and client 110 may desire to read or write data on storage device 130, or perform various other storage requests, such as copying data between devices, or getting or setting other attributes of the storage device. In such an embodiment, client 110 may first contact access server 120 in order to obtain the necessary access permissions and privileges regarding perform data I/O on storage device 130. Access server 120 may be configured to evaluate client 110's request and may, in some embodiments, require proper authentication credentials from client 110 before granting access permissions to client 110. When granting I/O privileges to client 110 regarding storage device 130, access server 120 may generate an access token, or capability token, that not only may specify the exact permissions and privileges that client 110 may perform or request on storage device 130, but may also include a revocable token identifier previously obtained from storage device 130. Thus, in some embodiments, when client 110 provides the access token to storage device 130 during an I/O or storage request, storage device 130 may check the validity of access token by verifying that the revocable token identifier was one previously issued to access server 120 and that it has not been revoked.

In some embodiments, the access tokens issued by access server 120 may include secure or non-forgeable information making it difficult or impossible for some non-trusted device or process to create a usable access token. For example, in one embodiment, access server 120 may encrypt a portion or all of the information in an access token using a unique key that may be known by only access server 120 and storage device 130, or using public/private key pairs agreed upon between access server 120 and storage device 130. In another embodiment, a digital signature may be used, such as based on public key cryptography, with the signature being included in the access token. A digital signature may also be created by using a secure hashing algorithm such as SHS or MD5 to hash the contents of the token, plus a shared secret between access server 120 and storage device 130. In the embodiments based on digital signatures, the signature may be defined over additional values that are known in the environment. For example, the data that is hashed for the digital signature may comprise the access rights token plus additional data such as the network address or secure identity of access client 110. Storage device 130 could then consider the access token invalid if it is not known to come from that access client. Various other forms of creating such non-forgeable tokens are known in the art, and all other forms should be considered useful for this invention.

When providing access tokens to clients, access server 120 may include revocable token identifiers in issued access tokens, in some embodiments. In such an embodiment, access server 120, may negotiate with one or more storage devices, such as storage device 130, the use of specific revocable token identifiers. After obtaining from storage device 130 a set, or range, of revocable token identifiers, access server 120 may, in one embodiment, grant access permissions on storage device 130 to client 110. When issuing an access token granting such access permissions, access server 120 may include one of the previously negotiated revocable token identifiers in the access token. Thus, when client 110 sends a storage request to storage device 130 including the access token, storage device 130 may verify that the token identifier from the access token is one of the tokens that access server 120 had previously arranged to use, according to one embodiment.

In some embodiments, access server 120 may issue block-level access permissions using access tokens including revocable token identifiers. In certain embodiments, access server may include information in access tokens that identifies specific data blocks or ranges of data blocks that client 110 may access, and may include information granting different access permissions or privileges for different data blocks in such an access token. Additionally, in one embodiment, access server 120 may grant access to specific data blocks within a data object on storage device 130, and may include information identifying those data blocks and the data object in an access token.

In distributed shared storage environments where multiple clients may need simultaneous access to the same data, datasets may be fixed into specific versions to ensure data integrity across client sessions. Certain tasks, like backing up one or more files, checking and correcting data consistency across mirrored storage devices, or virus detection and removal may require a single application or process to have exclusive access to one or more file images. Typically, general access to the datasets involved must be quiesced and all data caches must be flushed. Freezing the I/O to a specific volume or dataset in a shared storage environment may require that an access server individually cancel, or revoke all currently issued access tokens by transmitting recall or revocation messages to each client that has been issued access tokens for the particular dataset. Revoking access tokens individually may be burdensome when numerous clients and outstanding tokens are involved.

Access server 120 may, according to various embodiments, revoke one or more of the token identifiers by requesting, or informing, storage device 130 of such revocation. In such an embodiment, after access server 120 has requested that storage device 130 revoke a particular token identifier, storage device 130 may deny any future storage or I/O request including an access token with that token identifier. In some embodiments, access server 120 may be configured to revoke multiple token identifiers with one request. In this manner, access server 120 may easily revoke multiple access tokens, without the need to contact every client that has been granted an access token.

The manner in which revocable token identifiers are negotiated between a storage device and an access server may vary from embodiment to embodiment. For example, in one embodiment, access server 120 may request a set of revocable token identifiers from storage device 130 and storage device 130 may issue the revocable token identifiers to access server 120 prior to access server 120 issuing any access tokens granting access permissions on storage device 130. In another embodiment, access server may inform storage device 130 of the specific revocable identifiers it intends to use. In yet another embodiment, a separate revocable token identifier server may be used to issue token identifiers and inform both access serves and storage devices regarding the particular token identifiers are to be used.

The exact nature and structure of revocable token identifiers may vary according to different embodiments. For instance, in one embodiment, a revocable token identifier may be implemented as a single numeric value agreed upon between a storage device and an access server. For example, in such an embodiment, a storage device may keep track of a list of numeric values, either sequential or random, that have been negotiated with an access server for use with capability tokens. In another embodiment, a storage device may maintain a list of revoked token identifiers, rather than maintain a list of negotiated token identifiers. In yet another embodiment, storage device 130 may allow an access server to use any numeric value as a revocable token identifier, and then maintain a mapping of revoked token identifiers from each access server issuing access tokens for storage device 130.

A client device, such as client 110, may be any of various types of devices, including, but not limited to, a personal computer system, desktop computer, laptop or notebook computer, mainframe computer system, handheld computer, workstation, network computer, a consumer device, or any type of networkable peripheral device such as storage devices, switches, modems, routers, etc, or in general any type of networkable computing device with a digital heartbeat capable of communicating with processes or devices in a distributed shared storage environment.

Network 100, as illustrated in FIG. 1, may comprise any of various network technologies according to various embodiments. Network 100 may be a local area network, storage area network fabric, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, Infiniband, VAX CI, or ServerNet, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, network 100 may comprise shared storage or shared memory for communicating between different computer systems or between processes within the same computer system, according to some embodiments. In some embodiments, Network 100 may be the interconnect network for any of various distributed shared storage environments, including, but not limited to, network file system (NFS), common Internet file system (CIFS), storage area network (SAN), network attached storage (NAS), storage-network aggregation, multi-site block storage, object-based storage devices (OBSD), or other out-of-band, distributed, or shared storage models.

A server device, such as access server 120, may be any of various types of devices, including, but not limited to, a personal computer system, desktop computer, laptop or notebook computer, mainframe computer system, handheld computer, workstation, network computer, a consumer device, or any type of networkable peripheral device such as storage devices, switches, modems, routers, etc, or in general any type of networkable computing device with a digital heartbeat capable communicating with other processes or devices in a distributed shared storage environment. Access server 120 may be configured to couple over network 100 to one or more other devices via one or more wired or wireless network interfaces.

A storage device, such as storage device 130, may be any type of networkable computing device with a digital heartbeat capable communicating with and providing data storage services to other devices or processes in a distributed shared storage environment. According to various embodiments, storage device 130 may be configured to implement any of numerous data storage models including but not limited to, storage-network attach, storage-network aggregation (SNA), network attached storage (NAS), storage area network (SAN), Redundant Array of Independent (or Inexpensive) Disks (RAID), Just a Bunch of Disks (JBOD), Object Based SCSI Disks (OSD), intelligent storage devices, etc. In certain embodiments, storage device 130 may be configured to implement a combination of different data storage models. Storage device 130 may utilize one or more of numerous types of storage media including but not limited to Hard disk storage, floppy disk storage, removable disk storage, flash memory and random access memory (RAM) are examples of storage media. The terms "storage" and "storage medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The storage medium may include other types of storage as well, or combinations thereof.

Figure 2:
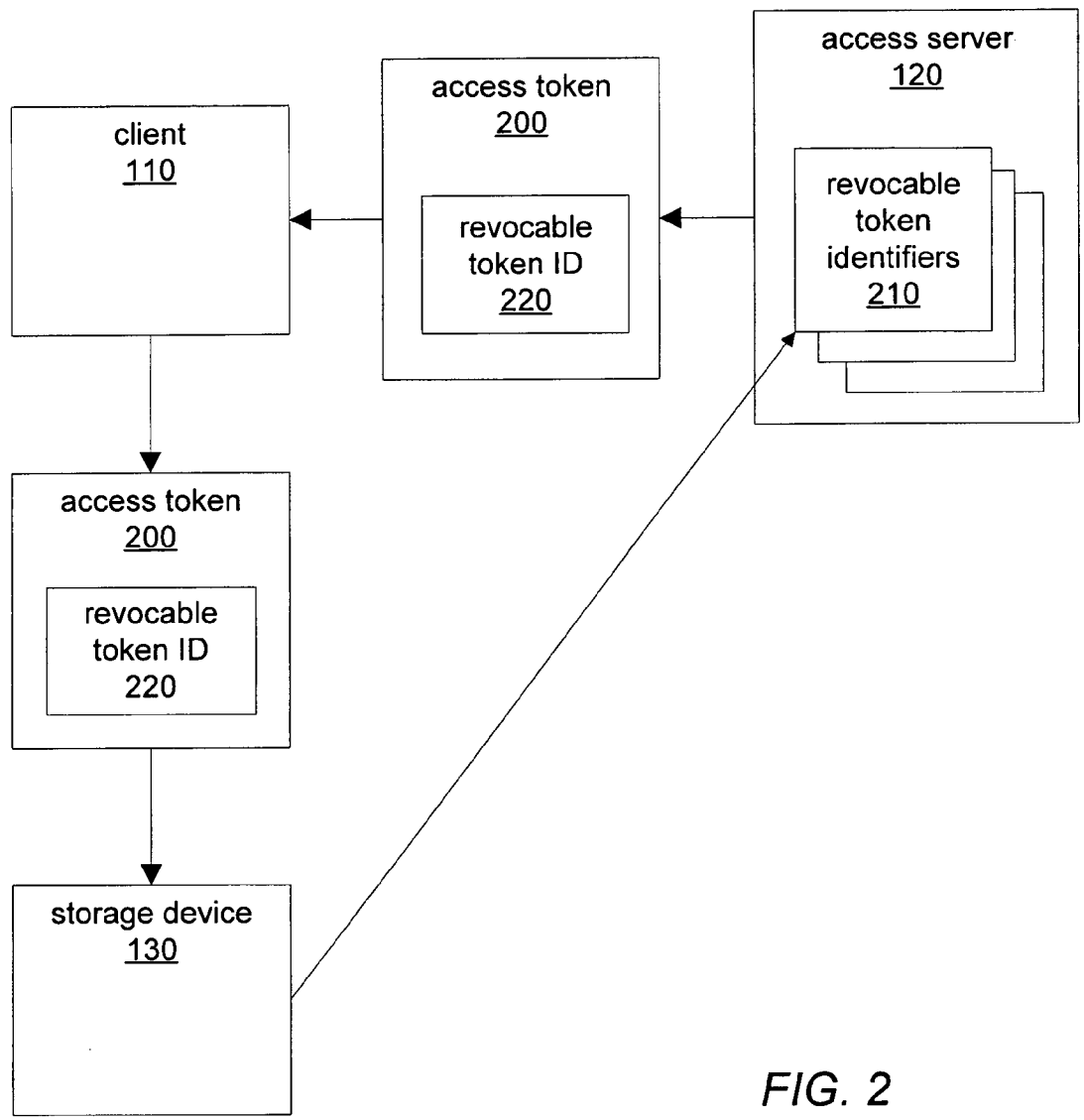
FIG. 2 is a block diagram illustrating the use of revocable token identifiers and access tokens in one embodiment.

FIG. 2 is a block diagram illustrating, according to one embodiment, access server 120 obtaining revocable token identifiers and issuing an access token including a revocable token identifier to client 110. In the embodiment illustrated by FIG. 2, storage device 130 issued one or more revocable token identifiers 210 to access server 120. As described above storage device 130 may issue revocable token identifiers 210 to access server 120 in response to a request from access server 120, or may provide them as a part of a standard system registration procedure, according to various embodiments. Additionally, in other embodiments, storage device 130 may not include or identify the specific token identifiers, but may instead identify a range of revocable token identifiers or may inform access server 120 that it will accept token identifiers that access server 210 generates. In yet other embodiments not illustrated by FIG. 2, access server 120 may generate and send the revocable token identifiers to storage device 130.

In some embodiments, access server 120 may negotiate and arrange the use of revocable token identifiers with storage device 130 prior to receiving any access requests regarding storage device 130. In other embodiments however, access server 120 may not arrange the use of any specific revocable access tokens until the first access request for storage device 130 is received. In such an embodiment, access server 120 may, in response to receiving a first access request for storage device 130, then negotiate the use of a number of revocable token identifiers with storage device 130 that may be used not only for the initial access request, but for subsequent access requests as well. In other words, in certain embodiments, access server 120, may after obtaining a number revocable token identifiers in response to receiving a first access request for storage device 130, then use those token identifiers with subsequent access requests without further negotiations or communications with storage device 130.

After negotiating the use of revocable token identifiers with storage device 130, access server 120 may, in response to an access request from client 110, generate access token 200 including one of the revocable token identifiers, revocable token ID 220. In some embodiments, access token 200 may also include other information, such as specific data block identifiers and permissions, and also may include secure or encrypted information making it a non-forgeable access token, as described above. Client 110 may, in one embodiment, present access token 200 to storage device 130 as part of a storage request. As described above, in response to receiving a storage request from client 110 including access token 200, storage device 130 may use revocable token ID 220 to verify the validity of access token 200 and may also verify that revocable token ID 220 has not been revoked, in certain embodiments. In some embodiments, storage device may also perform other techniques to ensure the validity of access token 200 and thereby the storage request of client 110. Thus, storage device 130 may, according to one embodiment, verify the validity of revocable token ID 220, before granting, or performing the request data I/O from client 110.

Figure 3:
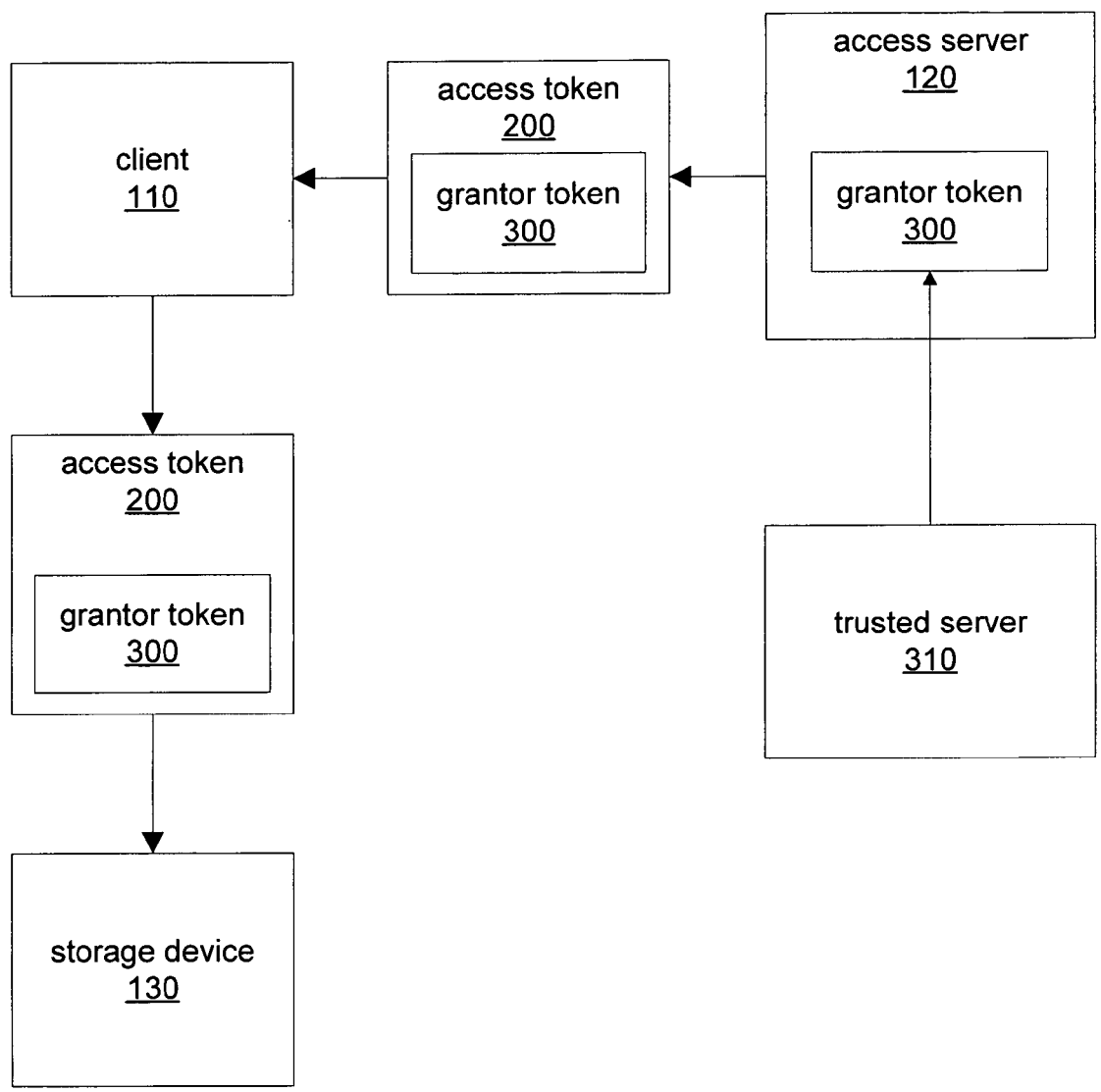
FIG. 3 is a block diagram illustrating, in one embodiment, the use of grantor tokens with access tokens.

According to some embodiments, access server 120 may obtain its right to issue access tokens regarding storage device 130 from another, more trusted, server. Such an embodiment is illustrated in FIG. 3. A trusted server 310 may be configured to grant permissions for other servers to issue capability tokens granting access permissions on storage device 130. For example, trusted server 310 may be a volume server that may, in one embodiment, allow other server to grant access permissions for a specific volume, or for specific portions of a volume, on storage device 130. In another example according to a different embodiment, trusted server 310 may be configured to manage a volume that spans more than one storage device and may therefore grant permission for an access server, such as access server 120, to issue capability tokens allowing access to the various data blocks that make up a specific volume on the different storage devices. According to one embodiment, trusted server 310 generates and provides a grantor token 300 to an access server, such as access server 120. In such an embodiment, access server 120 then may include grantor token 300 in access tokens that it generates and issues to client 110. Thus, access token 200 becomes a compound, or layered token, in some embodiments. Therefore, when client 110 presents access token 200, including grantor token 300, storage device 130 may, according to some embodiments, be able to use grantor token 300 to verify that the access permissions specified in access token 200 are valid.

In one embodiment, access server 120 may, after obtaining grantor token 300 from trusted server 310, contact storage device 130 and obtain one or more revocable token identifiers as described above. In other embodiments however, trusted server 310 may negotiate or obtain multiple revocable token identifiers for use with storage device 130 and may provide one or more of those token identifiers to access server 120. Thus, in certain embodiments, trusted server 310 may be able to allow multiple access servers to issue access tokens verifiable by storage device 130, even when storage device 130 has had no communication with nor has any specific information about the identity of the specific access servers.

Figure 4:
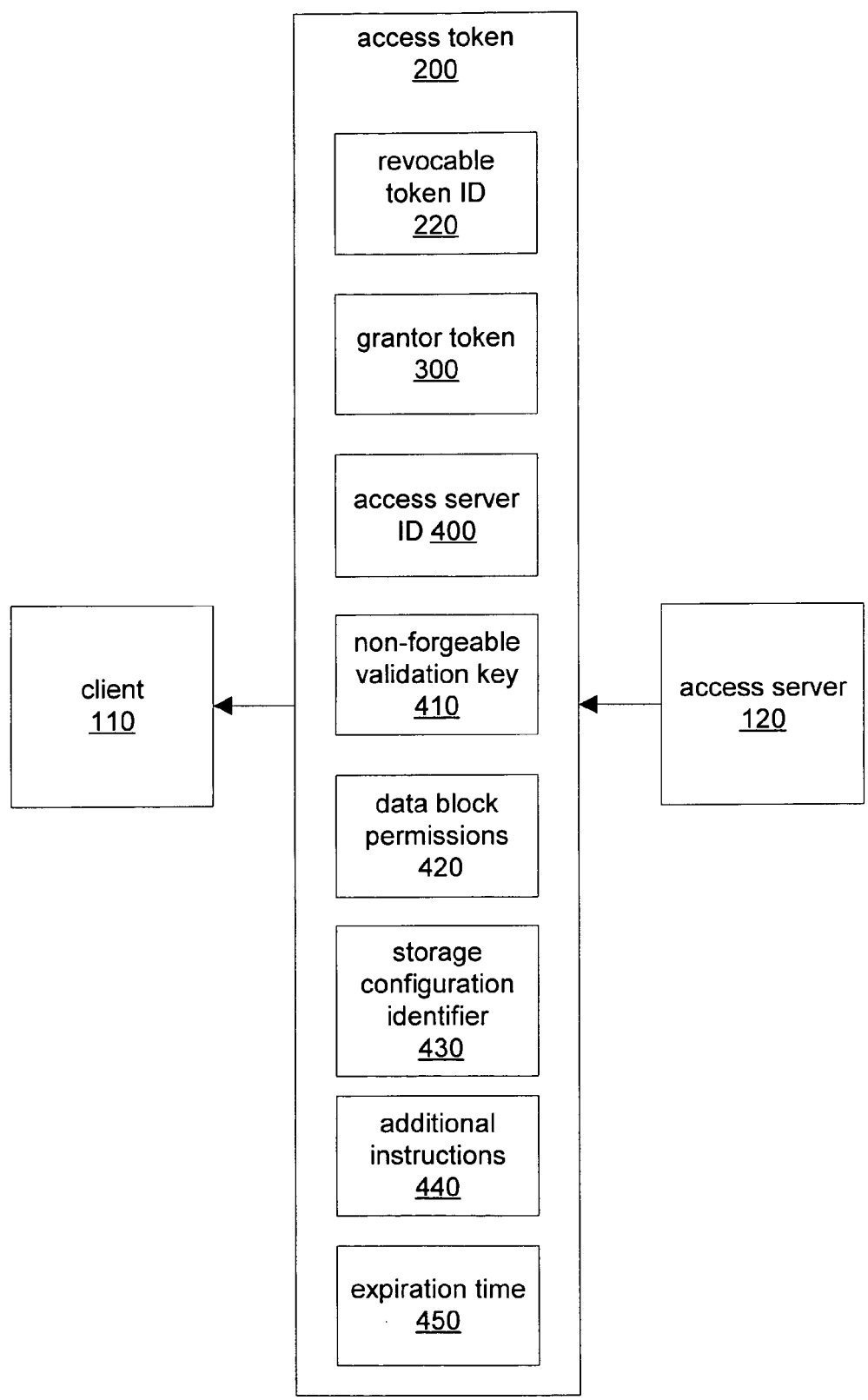
FIG. 4 illustrates some of the possible options for use with access tokens, according to certain embodiments.

FIG. 4 illustrates, according to various embodiments, some of the many different variations of access tokens that access servers may generate. As described above, access server 120 may generate and issue to client 110 an access token, such as access token 200, in one embodiment. Access server 120 may include many different types of information in access token 200, according to various embodiments. For example, as described above, access server 120, may include revocable token ID 220.

In other embodiments, access server 120 may include information relating to the validity or security of access token 200, such as grantor token 300, described above, access server ID 400, or non-forgeable validation key 420. For instance, in one embodiment, access server 120 may include information allowing a storage device, such as storage device 130, to verify that access token 200 was indeed generated and issued by access server 120. For example, access server ID 400 may comprise the identity of access server 120 or may include information that allows a storage device to verify and validate access server ID 400 through other means. Additionally, according to other embodiments, access server 120 may include non-forgeable validation key 410 in access token 200. In one embodiment, non-forgeable validation key 410 may be encrypted using a secret key known only by access server 120 and storage device 130, and thus storage device 130 may be able to verify the validity of access token 200 by decrypting and verifying the encrypted portion of non-forgeable validation key 410. In other embodiments, non-forgeable validation key 410 may be comprise encrypted versions of the access permissions granted by access token 200.

Access server 120 may also include information regarding the specific permissions and privileges granted by access token 200 in access token 200, according to various embodiments. For example, in one embodiment, access server 120 may include information identifying the specific data blocks or ranges of data blocks for which access token 200 grants access permission, as illustrated by data block permissions 420. In another embodiment, access server 120 may include in access token 200 a storage configuration identifier, such as storage configuration identifier 430, that may identify the specific generation or version of a volume on storage device 130, that includes the data blocks for which access token 200 grants access privileges, or some other aspect of virtual or physical storage configuration whose changes might require invalidating previously issued access right tokens. In yet another embodiment, access server 120 may include in access token 200 a volume ID in addition to or instead of storage configuration identifier 430. When including storage configuration identifiers in access tokens, access server 200 or storage device 130 may revoke all issued access tokens by changing the current configuration identifier for a particular volume or for some other agreed upon aspect of the virtual or physical storage configuration.

Additionally, in some embodiments, access token 200 may include additional instructions regarding operations for storage device 130 to perform in conjunction with any storage request including access token 200. For example, in one embodiment, storage device 130 may be configured to optionally use various mirroring techniques when performing requested data I/O and additional instructions 440 may include information indicating the specific mirroring technique or identifying another mirroring device for storage device to use when mirroring the data from a particular client, such as client 110. In another example, additional instructions may request that storage device 130 use a particular encryption technique or may include an encryption key to use when encrypting or decrypting data associated with a storage request including access token 200. In other embodiments, such additional instructions may request that a storage device trigger snapshot related operations, such as making a copy of the prior contents of the one or more data blocks on the storage device when those data blocks are overwritten by a storage request. Additionally, in some embodiments, access server 120 may include additional instructions requesting that a storage device divert data to a separate system, such as to a replication server or replicating storage device.

In some embodiments, rather than requesting that a storage device revoke the particular revocable token identifier, access server 120 may include expiration time 450 in access token 200. In such an embodiment, storage device 130 may, when receiving a storage request including an access token that has an expiration time, grant the storage request only if the access token has not expired as indicated by the included expiration time. Alternatively, in other embodiments, a storage device, such as storage device 130, may associate an expiration time with a revocable token identifier. Additionally, access server 120 may be able coordinate with storage device 130 to specify the expiration time associated with a particular revocable token identifier. Thus, in such an embodiment, access token 120 may not need to revoke a token identifier by sending a request to storage device 130 at the desired expiration time, but instead may be able to coordinate with storage device 130 to assign or associate the desired expiration time with the revocable token identifier and therefore allow storage device 130 to revoke the token identifier, and any access token including the token identifier, automatically at the appropriate time.

In one embodiment, access server 120 may, rather than include un-secure versions of data block permissions 420, storage configuration identifier 430, access server ID 400, additional instructions 440, and expiration time 450, include encrypted versions of those items in non-forgeable validation key 410. Thus, in such an embodiment, storage device 130 may be able to verify the validity of access token 200 and obtain the other information comprised in access token 200 by decrypting the contents of non-forgeable validation key 410. As described above, the specific structure of non-forgeable validation key 410 may vary according to different embodiments. For instance, in one embodiment, non-forgeable validation key 410 may represent a secure hash of other information, such as a node ID of client 110, while in other embodiments, it may represent an encrypted identifier originally supplied by storage device 130 to access server 120.

It should be noted that while FIG. 4 illustrated access token 200 including several different items of information, such as revocable token ID 220, grantor token 300, access server ID 400, non-forgeable validation key 410, data block permissions 420, storage configuration identifier 430, additional instructions 440, and expiration time 450, in other embodiments, access token 200 may not include all of these items and may, in some embodiments, include a single of these items or various combinations of them.

Figure 5:
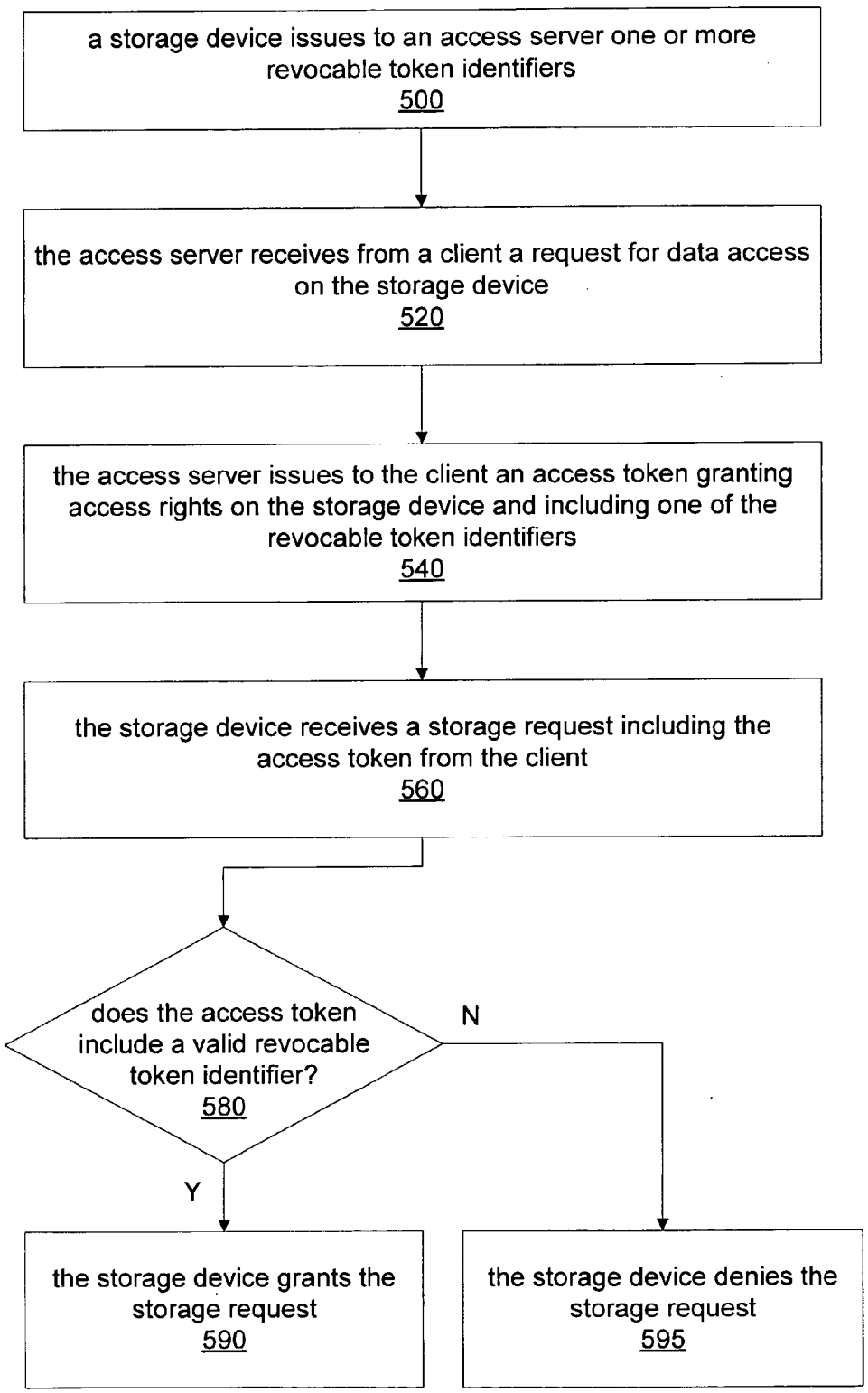
FIG. 5 is a flowchart illustrating, according to one embodiment, a method for implementing secure capability tokens with revocable token identifiers.

FIG. 5 is a flowchart illustrating, according to one embodiment, a method for providing secure access to a storage device using revocable token identifiers. As described above, a storage device, such as storage device 130 may issue to an access server, such as access server 120, one or more revocable token identifiers, as illustrated by block 500. Storage device 130 may issue token identifiers in response to request from access server 120, or may issue them as part of a standards startup procedure, according to various embodiments. In another embodiment, not illustrated by FIG. 5, access server 120 may provide the revocable token identifiers to storage device 130. In one embodiment, storage device 130 may maintain an association between the revocable token identifiers and access server 120 such that storage device 130 may later verify that a token identifier included in an access token was issued to access server 120.

As described above, revocable token identifiers may be represented in various ways, according to different embodiments. In one embodiment, storage device 130 may use a different individual numeric value for each token identifier. In another embodiment, storage device 130 may use a data structure containing other information, such as an expiration time, or information identifying the volume or range of blocks for which that particular token identifier may be used.

After storage device 130 and access server 120 have negotiated the particular revocable token identifiers to use, access server 120 may receive from a client a request for data access on storage device 130, as illustrated by block 520. Such an access request may take various forms according to different embodiments. For example, in one embodiment, a client, such as client 110, may send a TCP/IP message across network 110 to request access to storage device 130. In another embodiment, client 110 may be configured to invoke a specific request method on access server 120 through the use of a remote method invocation API. In response to receiving an access request from client 110 for I/O permissions on storage device 130, access server 120 may issue to client 110 an access token granting access rights on storage device 130 and that includes one of the revocable token identifiers, as illustrated by block 540.

In one embodiment, access server 120 may include information identifying access server 120 in the issued access token, as described above and illustrated by access server ID 400 in FIG. 4. In such an embodiment, storage device 130 may be able to validate an access token by verifying that the included revocable access token was issued to the access server identified by the access token.

Client 110 may then send a storage request to storage device 130 including the access token from access server 120. After storage device 130 receives a storage request from client 110 including the access token, as illustrated by block 560, storage device 130 may determine whether the access token includes one of the revocable token identifiers, as illustrated by decision block 580. If the access token include a valid one of the revocable token identifiers, storage device 130 may then grant the storage request as illustrated by block 590. Alternatively, if the access token does not include a valid one of the revocable token identifiers, storage device 130 may deny the storage request as illustrated by block 595.

In some embodiments, storage device 130 may be configured to verify that the revocable token identifier included with the access token was actually issued to the same access server that generated the access token. For example, in one embodiment access server 120 may include access server ID 400, described above, in access token 200 along with revocable token identifier 220 when issuing access token 200 to client 110. Client 110 may include access token 220 in a storage request to storage device 130 and storage device 130 may be able to verify, because it maintains associations between token identifiers and access servers, that access server 120 did in fact generate access token 200 and that revocable token identifier 220 was issued to access server 120. In such an embodiment, storage device 130 may grant a storage request including access token 200 only if it includes a valid revocable token identifier and that the token identifier was issued by the access server that is identified in access token 200. Otherwise, storage device 130 may deny the storage request.

Additionally, in block 540, access server 120 may, in one embodiment, include a grantor token, such as grantor token 300, obtained from a trusted server in access token 200, as described above. In such an embodiment, storage device 130 may be configured to use grantor token 300 while validating access token 200 and may only grant a storage request including access token 200 if it contains a valid grantor token.

Figure 6:
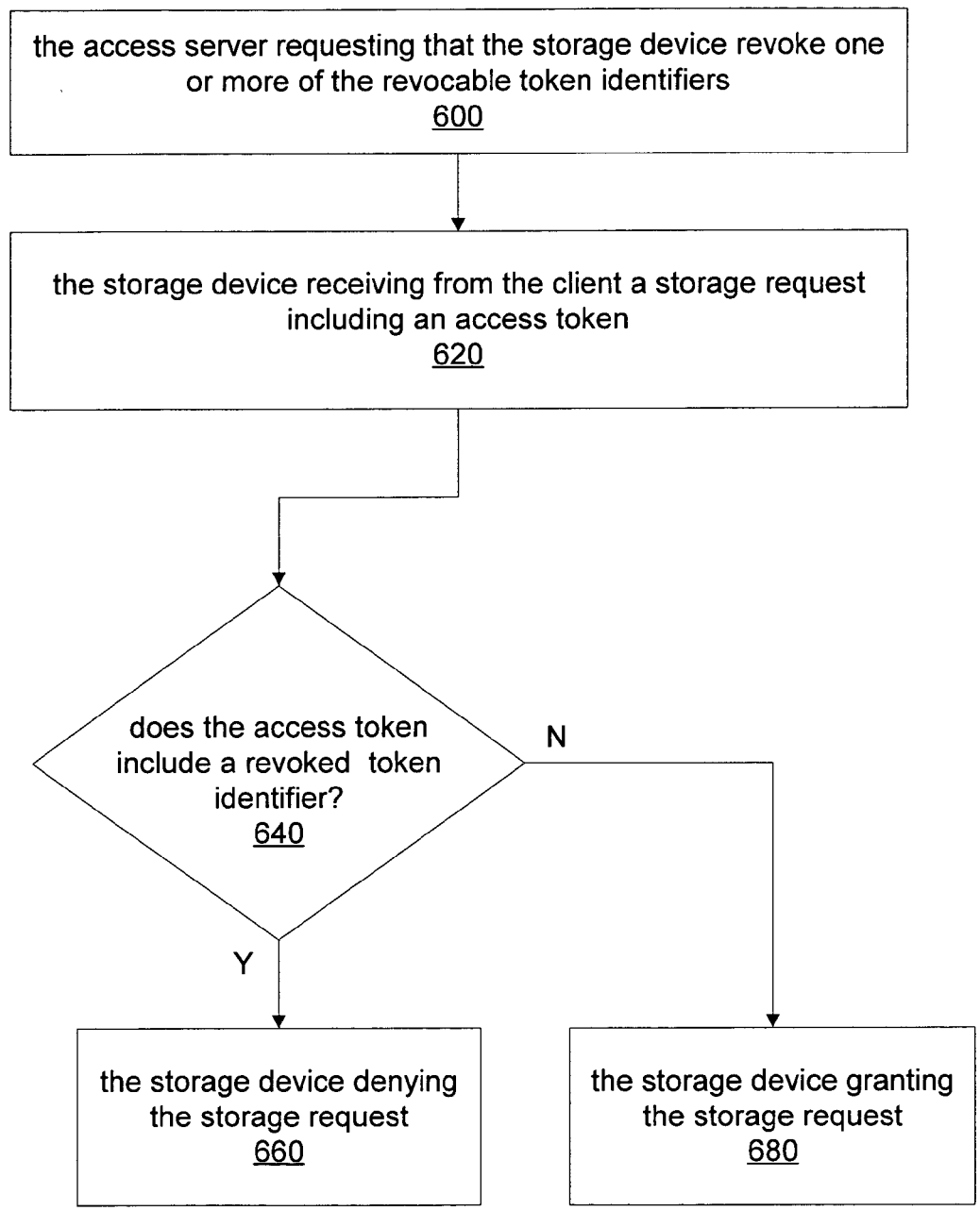
FIG. 6 is a flowchart illustrating one embodiment of a method for revoking revocable token identifiers.

FIG. 6 is a flowchart illustrating, according to one embodiment, a method for revoking a revocable token identifier. For instance, in such an embodiment, after issuing access token 200 to client 110 granting access privileges on storage device 130, as described above, access server 120 may, decide to revoke revocable token identifier 220 included in access token 200. For example, access server 120 may determine that it is time to perform some maintenance or diagnostic task on storage device 130. To revoke a token identifier included in an issued access token, such as revocable token identifier 220, access server 120 may send a revoke request to storage device 130, according to one embodiment and illustrated by block 600. In such an embodiment, storage device 130 may keep a list of revoked token identifiers, and may deny any current or future storage request including an access tokens with a revoked token identifier. For example, access server 120 may notify storage device 130 that it has revoked revocable token identifier 220, and therefore when, as shown by block 620, client 110 makes a storage request including access token 200, that includes revocable token identifier 220, storage device 130 may deny the storage request, as shown in block 660, after determining that revocable token identifier has been revoked by access server 120, as illustrated by block 640. In other words, storage device 130 may, in certain embodiments, only grant storage requests that include non-revoked token identifiers, as illustrated by block 680.

Figure 7:
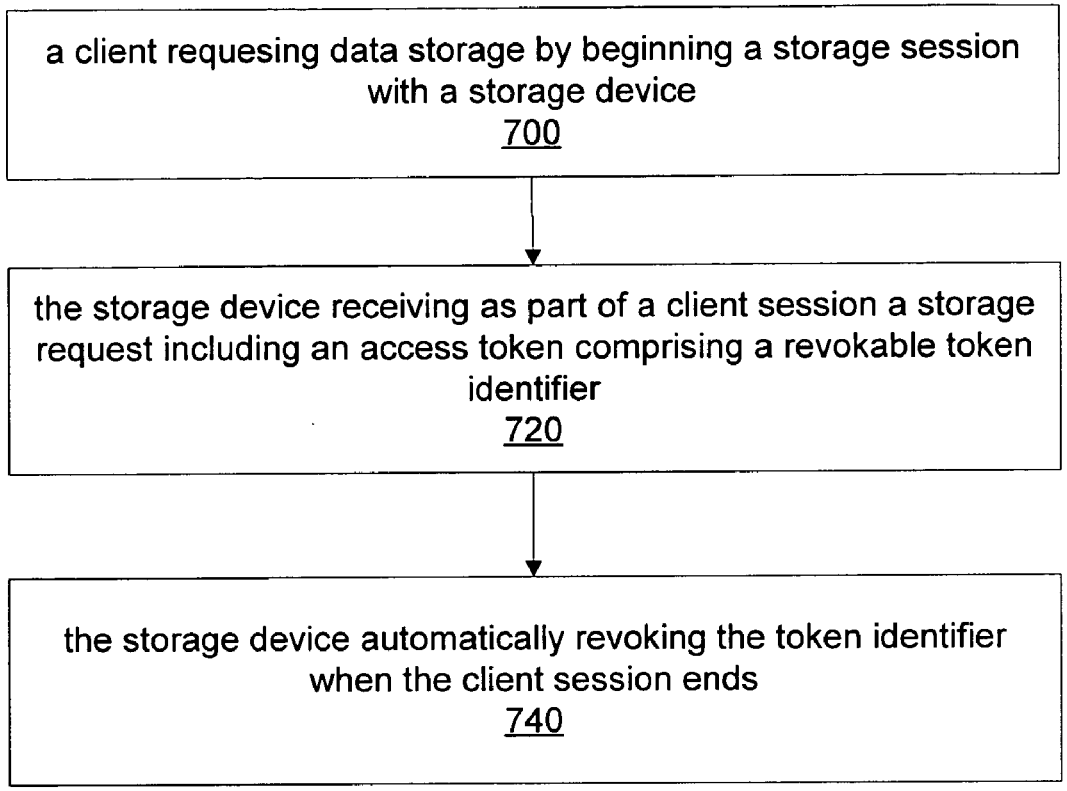
FIG. 7 is a flowchart illustrating, according to certain embodiments, a method for automatically revoking a one-time use revocable token identifier.

FIG. 7 is a flowchart illustrating, according to one embodiment, a method for implementing automatically revoking token identifiers. In some embodiments, it may be desirable to have token identifiers, and therefore access tokens, automatically become invalid or revoked when a client has finished using them without an access server having to individually request that a storage device revoke each one. For instance, access server 120 and storage device 130 may both be configured, in one embodiment, to use one-time-use revocable token identifiers. In such an embodiment, an access server may issue an access token including one of these one-time-use token identifiers to a client, and a storage device may revoke that token identifier after the client has completed one or more storage requests.

For example, in one embodiment, client 110 may be using a session style interface for data storage requests and may request data storage by beginning a storage session with storage device 130, as illustrated by block 700. In such an embodiment, client 110 may present access token 200 to storage device 130 with every storage request, as illustrated by block 720, or may present access token 200 only at the start of a storage session. Client 110 may use a session ID associated with the storage session for all subsequent storage requests. Thus, storage device 130 may still be able to verify and read all relevant information from access token 200, such as any special instructions, when client 110 first presents the access token. Additionally, storage device 130 may store the one-time-use revocable token identifier when the access token is presented at the start of the session, and may later, when client 110 ends the session, automatically revoke the token identifier, and thus the access token, as illustrated by block 740.

In certain embodiments, storage device 130 may be configured to automatically revoke a token identifier after a single storage request. For example, a client may only have permission to access some portion of data once, for a single read perhaps, or storage device 130 may be configured to implement a write only section of data.

In one embodiment, access server 120 may include in access token 200, or in revocable token identifier 220, information instructing storage device 130 that revocable token identifier 220 is a one-time-use token identifier and therefore storage device 130 may be configured to automatically revoke token identifier 220 when such information is present in access token 200.

Figure 8:
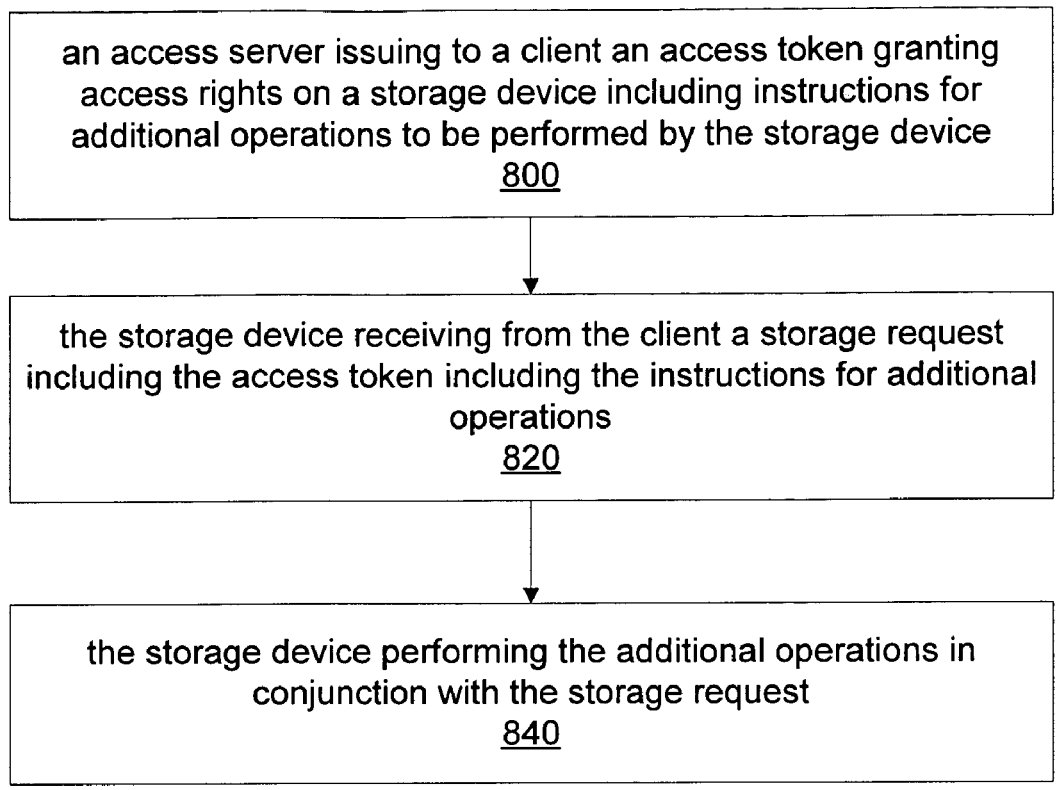
FIG. 8 is a flowchart illustrating one embodiment of a method for including instructions for additional storage device operations with access tokens.

FIG. 8 is a flowchart illustrating one embodiment of a method for a storage device to perform additional operations in conjunction with a storage request. As described above, an access token, such as access token 200, may include information identifying special instructions that a storage device, such as storage device 130, may perform in conjunction when a storage request. When including special instructions with an access token, an access server, such as access server 120, may issue to a client, such as client 110, an access token granting access rights on a storage device and may include instructions in the access token for additional operations to be performed by the storage device, as illustrated by block 800.

When a storage device, such as storage device 130, receives a storage request from a client including an access token with special instructions for additional operations as illustrated by block 820, the storage device may then, if the access token is verified to be valid, perform the additional operations in conjunction with the storage request, as illustrated by block 840. In one embodiment, access server 120 may include special instructions in an access token without client 110's knowledge, while in other embodiments client 110 may request the additional operations when obtaining the access token from access server 120.

For example, access server 120 may want storage device 130 to mirror the data from a particular client, such as client 110, or may wish to have storage device log client 110's data in a certain way, or may wish to have client 110's data encrypted, according to various embodiments. In general, instructions for performing any operation can be included in an access token, and the specific nature of individual instructions may vary from embodiment to embodiment.

Figure 9:
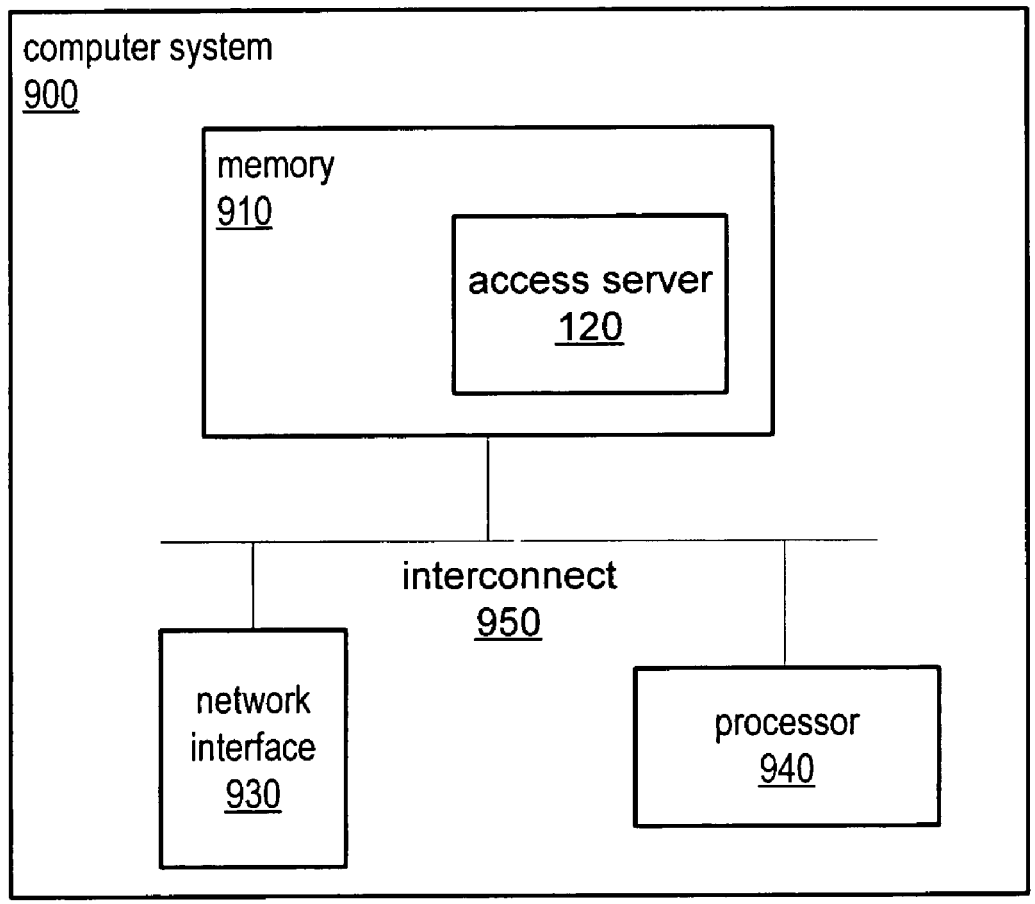
FIG. 9 is a block diagram illustrating a computer system suitable for implementing secure block-level capability tokens including revocable token identifiers, according to one embodiment.

FIG. 9 illustrates a computing system capable of implementing secure, block-level capability tokens including revocable token identifiers as described herein and according to various embodiments. Computer system 900 may be any of various types of devices, including, but not limited to, a personal computer system, desktop computer, laptop or notebook computer, mainframe computer system, handheld computer, workstation, network computer, a consumer device, a smart appliance, or any type of networkable peripheral device such as storage devices, switches, modems, routers, etc, or in general any type of networkable computing device with a digital heartbeat. Computer system 900 may include at least one processor 940. Processor 940 may couple across interconnect 950 to memory 910 and network interface 930. Network interface 930 may be any of various types of interfaces configured to couple with and communicate over network 100 illustrated in FIG. 1 and described above.

Memory 910 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 910 may include program instructions configured to implement secure, block-level capability tokens including revocable token identifiers as described herein. In certain embodiments memory 910 may include program instructions configured to implement an access server, such as access server 120. In one embodiment, access server 120 may include program instructions configured to implement secure, block-level capability tokens including revocable token identifiers. In other embodiments, memory 910 may include program instructions configured to implement a storage device such as storage device 130 illustrated in FIG. 1 and described above. In some embodiments, such a storage device implemented by program instructions included in memory 910 may perform some or all of the functions for implementing secure, block-level capability tokens including revocable token identifiers as described herein.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
   a storage device negotiating a plurality of revocable token identifiers with an access server,
     wherein the access server, in response to receiving from a client an access request for one or more blocks in a specific storage volume, issues to the client an access token comprising:
       one of the revocable token identifiers for the requested one or more blocks, and
       a token for the specific volume,
       such that the access token is a layered token granting access permission to the specific volume and to one or more specific blocks or one or more ranges of blocks of data within the specific volume; and
   the storage device, in response to receiving from the client a storage request including the issued access token, granting the storage request if the access token includes the token for the specific volume and one of the revocable token identifiers.

2. The method of claim 1, further comprising:
   the storage device associating the one or more revocable token identifiers with the access server;
   wherein the issued access token comprises information identifying the access server; and
   wherein the storage device granting the storage request comprises granting the storage request if the access token includes information identifying the access server and also includes one of the revocable token identifiers associated with the access server as identified by the information in the access token.

3. The method of claim 1, further comprising:
   the access server requesting that the storage device revoke one or more of the revocable token identifiers; and
   the storage device, in response to receiving from the client a storage request including the access token, denying the storage request if the access token includes the revoked token identifier.

4. The method of claim 1, wherein the storage device receives the storage request as part of a client session, the method further comprising the storage device automatically revoking the issued token identifier at the end of the client session.

5. The method of claim 1, wherein the access token comprises information indicating an expiration time, the method further comprising the storage device, in response to receiving from the client the storage request including the access token, denying the storage request if the expiration time of the access token indicates that the access token has expired.

6. The method of claim 1, further comprising:
   the storage device associating an expiration time with one or more of the revocable token identifiers;
   the storage device, in response to receiving from the client the storage request including the access token, denying the storage request if the access token includes a revocable token identifier that is associated with an expiration time that indicates that the token identifier as expired.

7. The method of claim 1, further comprising:
   the storage device maintaining a storage configuration identifier, wherein the access token comprises the storage configuration identifier, wherein the storage device granting the storage request comprises granting the storage request if the access token includes a storage configuration identifier matching the maintained storage configuration identifier; and
   revoking all issued access tokens by changing the value of the maintained storage configuration identifier.

8. The method of claim 1, wherein the access token comprises information identifying one or more data block ranges on the storage device.

9. The method of claim 1, further comprising the access server including information in the access token indicating additional operations to be performed by the storage device in conjunction with a storage request from the client including the issued access token.

10. The method of claim 9, further comprising the storage device, in response to receiving the storage request from the client, performing the additional operations as indicated by the information of the issued access token.

11. The method of claim 9, wherein the additional operations indicated by the information in the access token comprise instructions for the storage device to perform trigger snapshot related operations.

12. The method of claim 9, wherein the additional operations indicated by the information in the access token comprise instructions for the storage device to redirect data to a second system.

13. The method of claim 1, further comprising:
   a trusted server issuing to the access server a grantor token, wherein the grantor token comprises information identifying the trusted server, wherein the issued access token comprises the grantor token, wherein the token for the specific volume is the grantor token; and
   wherein the storage device granting the storage request comprises granting the storage request if the access token includes one of the revocable token identifiers and if the access token includes a valid grantor token identifying the trusted server.

14. The method of claim 13, further comprising the storage device sending the grantor token to the trusted server for validation, and wherein the storage device granting the storage request comprises granting the storage request if the trusted server successfully validates the grantor token.

15. The method of claim 1, wherein the access token includes a non-forgeable validation key, and wherein the storage device granting the storage request comprises granting the storage request if the access token includes one of the revocable token identifiers and if the access token includes a valid non-forgeable validation key.

16. A device, comprising:
a processor; and
a memory comprising program instructions configured to:
negotiate a plurality of revocable token identifiers with a storage device;
in response to receiving from a client an access request for one or more blocks in a specific storage volume, issue to the client an access token comprising;
one of the revocable token identifiers for the requested one or more blocks, and
a token for the specific volume,
such that the access token is a layered token granting access permission at both the volume-level and the block-level to the one or more blocks of data within the specific volume; and
wherein the storage device is configured to in response to receiving from the client a storage request including the issued access token, grant the storage request if the access token includes the token for the specific volume and one of the revocable token identifiers.

17. The device of claim 16, wherein the program instructions are further configured to request that the storage device revoke one or more of the revocable token identifiers, wherein the storage device is configured to in response to receiving from the client an IO request including the issued access token, deny the storage request if the access token includes the revoked token identifier.

18. The device of claim 16, wherein the access token comprises information identifying one or more data blocks on the storage device.

19. The device of claim 16, wherein the access token comprises information identifying one or more data block ranges of a data object on the storage device.

20. The device of claim 16, wherein as part of said issuing the program instructions are further configured to include information in the access token indicating additional operations to be performed by the storage device in conjunction with a storage request from the client including the issued access token, and wherein the storage device is configured to perform the additional operations in response to receiving from the client a storage request including the access token.

21. The device of claim 16, wherein the program instructions are further configured to receive a grantor token from a trusted server, wherein the grantor token comprises information identifying the trusted server, wherein the issued access token comprises the grantor token, wherein the token for the specific volume is the grantor token, wherein the storage device is configured to grant the storage request the storage request if the access token includes one of the revocable token identifiers and if the access token includes a valid grantor token identifying the trusted server.

22. The device of claim 16, wherein the program instructions are further configured to include an non-forgeable validation key in the access token, and wherein the storage device is configured to grant the storage request if the access token includes one of the revocable token identifiers and if the access token includes a valid unforgeable validation key.

23. A non-transitory computer accessible medium, comprising program instructions configured to implement: (emphasis added)
receiving from a storage device one or more revocable token identifiers;
in response to receiving from a client an access request for one or more blocks in a specific storage volume, issue to the client an access token comprising;
one of the revocable token identifiers for the requested one or more blocks, and
a token for the specific volume,
such that the access token is a layered token granting access permission to the specific blocks or one or more ranges of blocks of data within the specific volume; and
wherein the storage device is configured to in response to receiving from the client a storage request including the issued access token, grant the storage request if the access token includes the token for the specific volume and one of the revocable token identifiers.

24. A system, comprising one or more devices configured to implement:
negotiating a plurality of revocable token identifiers with an access server;
receiving from the storage device one or more revocable token identifiers;
in response to receiving from a client an access request for one or more blocks in a specific storage volume, issuing to the client an access token comprising:
one of the revocable token identifiers for the requested one or more blocks, and
a token for the specific volume,
such that the access token is a layered token granting access permission to the specific volume and to one or more specific blocks or one or more ranges of blocks of data within the specific volume; and
in response to receiving from the client a storage request including the issued access token, granting the storage request if the access token includes the token for the specific volume and one of the revocable token identifiers.

* * * * *

UNITED STATES PATENT AND TRADEMARK OFFICE
CERTIFICATE OF CORRECTION

| | | |
|---|---|---|
| PATENT NO. | : 8,042,163 B1 | Page 1 of 1 |
| APPLICATION NO. | : 10/850466 | |
| DATED | : October 18, 2011 | |
| INVENTOR(S) | : Ronald S. Karr et al. | |

It is certified that error appears in the above-identified patent and that said Letters Patent is hereby corrected as shown below:

On The Title Page:

Item [73] "Assignee", delete "Symatec" and insert --Symantec-- in place thereof.

Signed and Sealed this
Twentieth Day of December, 2011

David J. Kappos
*Director of the United States Patent and Trademark Office*